United States Patent
Pepper

(10) Patent No.: US 11,311,799 B2
(45) Date of Patent: Apr. 26, 2022

(54) ROLE-PLAY SYNCHRONISATION SYSTEM

(71) Applicant: AUDIOPLAY AUSTRALIA PTY LTD, Victoria (AU)

(72) Inventor: Gemma Pepper, Vic (AU)

(73) Assignee: AUDIOPLAY AUSTRALIA PTY LTD, Victoria (AU)

( * ) Notice: Subject to any disclaimer, the term of this patent is extended or adjusted under 35 U.S.C. 154(b) by 136 days.

(21) Appl. No.: 16/614,990

(22) PCT Filed: May 18, 2018

(86) PCT No.: PCT/AU2018/050479
§ 371 (c)(1),
(2) Date: Nov. 19, 2019

(87) PCT Pub. No.: WO2018/209405
PCT Pub. Date: Nov. 22, 2018

(65) Prior Publication Data
US 2020/0179801 A1    Jun. 11, 2020

(30) Foreign Application Priority Data

May 19, 2017 (AU) .............................. 2017901906

(51) Int. Cl.
*A63F 13/327* (2014.01)
*A63F 13/54* (2014.01)
(Continued)

(52) U.S. Cl.
CPC ............ *A63F 13/327* (2014.09); *A63F 13/54* (2014.09); *A63F 13/814* (2014.09); *A63F 13/92* (2014.09)

(58) Field of Classification Search
CPC ...... A63F 13/327; A63F 13/54; A63F 13/814; A63F 13/92
See application file for complete search history.

(56) References Cited

U.S. PATENT DOCUMENTS

2006/0270395 A1   11/2006   Dhawan et al.
2008/0045140 A1   2/2008    Korhonen
(Continued)

OTHER PUBLICATIONS

SMIL—Synchronized Multimedia Integration Language, Wikipedia entry, version as of Feb. 25, 2017.

*Primary Examiner* — Tramar Harper
*Assistant Examiner* — Jeffrey K Wong
(74) *Attorney, Agent, or Firm* — Mark M. Friedman

(57) ABSTRACT

A system for synchronising role-play amongst two or more role-players; said system comprising: A portable digital device closely associated with each role-player; each portable digital device including at least a processor in communication with a memory thereby to execute commands of an application stored in the memory; the processor in communication with input/output apparatus as directed by the commands of the application stored in the memory; each portable digital device in communication with a local network thereby to place each portable digital device in communication with each other portable digital device participating in the role-play; a downloadable role-play and synchronisation application which is downloaded and stored on and executing on each portable digital device; a suite of audio files for each portable digital device participating in the role-play; each suite of audio files containing a file specific to each character in the role play which incorporates: a) The characters' internal dialogue; b) Dialogue between the character and other characters within the role play; c) Directions for the individualised, co-ordinated choreographed movement of the player; d) Sound effects, and; e) Musical score, and wherein content of the role-play, experienced through listening to the audio files, requires the player and their co-players, to physically enact a series of pre-determined, choreographed and co-ordinated move- (Continued)

ments which are a key component of the roleplay experience.

18 Claims, 6 Drawing Sheets

(51) Int. Cl.
  *A63F 13/814* (2014.01)
  *A63F 13/92* (2014.01)

(56) References Cited

U.S. PATENT DOCUMENTS

| | | |
|---|---|---|
| 2008/0222546 A1 | 9/2008 | Mudd et al. |
| 2009/0063995 A1 | 3/2009 | Baron et al. |
| 2011/0245944 A1 | 10/2011 | Louboutin |
| 2012/0082424 A1 | 4/2012 | Hubner |
| 2012/0165100 A1* | 6/2012 | Lalancette .............. A63F 13/44 463/42 |
| 2012/0246343 A1 | 9/2012 | Story, Jr. et al. |
| 2014/0188985 A1* | 7/2014 | Park ..................... H04L 67/38 709/203 |
| 2015/0209670 A1 | 7/2015 | Furumoto et al. |
| 2016/0050248 A1 | 2/2016 | Gayl et al. |
| 2017/0026509 A1 | 1/2017 | Rand |

\* cited by examiner

ROLE-PLAY SYNCHRONISATION SYSTEM

TECHNICAL FIELD

The present invention relates to a role-play synchronisation system and, more particularly although not exclusively, to such a system wherein players are equipped with apparatus and instructions which provide individualised, coordinated choreographed movements for all participants in a role-play.

BACKGROUND

In the modern day authors of works are looking for multiple avenues through which to communicate the product of their work. So, for example, a writer may write a book. The book may be made into a movie.

Alternatively a playwright may write a play. The play may be made into a movie.

These additional avenues are advantageous to the author in terms of promoting their work and deriving income and reputation therefrom.

It would be advantageous if an additional avenue could be provided for authors to exploit their work.

It is an object of the present invention to address or at least ameliorate some of the above disadvantages or provide a useful alternative.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

Definition: in this specification, the term "role playing" refers to interactions between players in a venue in which they physically act as characters they have been assigned. In the context of the invention this role playing action manifests as the player undertaking a series of physical movements under instructions from audio provided. The audio may include elements of vocal performance, musical expression and sound effects which guide the player to interpret their guided movements as elements in a scripted story. As such a player not only physically moves in time to the instructions but come to experience the narrative and emotional journey of the character he or she is acting.

SUMMARY OF INVENTION

Accordingly, in a first broad form of the invention, there is provided a system for synchronising role-play amongst two or more role-players; said system comprising:

A portable digital device closely associated with each role-player;

beach portable digital device including at least a processor in communication with a memory thereby to execute commands of an application stored in the memory;

the processor in communication with input/output apparatus as directed by the commands of the application stored in the memory;

each portable digital device in communication with a local network thereby to place each portable digital device in communication with each other portable digital device participating in the role-play; a downloadable role-play and synchronisation application which is downloaded and stored on and executing on each portable digital device;

a suite of audio files for each portable digital device participating in the role-play; each suite of audio files containing a file specific to each character in the role play which incorporates:
  a) The characters' internal dialogue;
  b) Dialogue between the character and other characters within the role play;
  c) Directions for the individualised, co-ordinated choreographed movement of the player;
  d) Sound effects, and;
  e) Musical score, and wherein content of the roleplay, experienced through listening to the audio files, requires the player and their co-players, to physically enact a series of pre-determined, choreographed and co-ordinated movements which are a key component of the roleplay experience.

Preferably, each player is bound both geographically and in time; players play the same role play while physically attending the same location.

Preferably, each portable digital device participating in the role-play commences execution of its respective script at the same time based on a synchronization signal communicated between all portable digital devices participating in the role-play.

Preferably, the synchronisation signal is sent when all portable digital devices participating in the role-play signal that the player associated with each portable digital device indicates they are ready to commence the role-play.

Preferably, the input/output apparatus includes radio communication apparatus in communication with a local transmitter/receiver.

Preferably, the local transmitter/receiver is a Wi-Fi router.

Preferably, the radio communication apparatus includes apparatus operating according to Wi-Fi radio protocol.

Preferably, during role-play, each role-player wears headphones to hear the audio files specifically associated with their chosen character, enabling them to physically enact the action as directed by the audio recording.

Preferably, the headphones substantially exclude external sound from being perceived by the player wearing the headphones.

Preferably, the portable digital devices check each other periodically and continuously for timing differences.

Preferably, one of the portable digital devices may assume the role of a server to applications running on others of the portable digital devices participating in a role-play.

Preferably, a one of the portable digital devices assumes the role of a server under predetermined conditions.

In another broad form of the invention, there is provided a method of role playing wherein players and their co-players, physically enact a series of pre-determined, choreographed and co-ordinated movements which are a key component of the roleplay experience; the method including the steps of:

Providing portable digital devices closely associated with each role-player; each portable digital device including at least a processor in communication with a memory thereby to execute commands of an application stored in the memory, Arranging communication of the processor with input/output apparatus as directed by the commands of the application stored in the memory, Connecting each portable digital device with a local network thereby to place each portable digital device in communication with each other portable digital device participating in the role-play, Providing a suite of audio files for each portable digital device participating in the role-play; each suite of audio files containing a file specific to each role playing character.

Preferably, the suite of audio files includes the characters' internal dialogue.

Preferably, the suite of audio files includes dialogue between the character and other characters within the role play.

Preferably, the suite of audio files includes directions for individualised, co-ordinated choreographed movement.

Preferably, the method further including each portable digital device participating in the role-play commencing execution of its respective script at the same time based on a synchronization signal communicated between all portable digital devices participating in the role-play.

Preferably, the synchronization signal is sent when all portable digital devices participating in the role-play signal that the player associated with each portable digital device indicates they are ready to commence the role-play.

In another broad form of the invention, there is provided a system for enabling role-play amongst two or more role-players; said system comprising:

A portable digital device closely associated with each role-player;

each portable digital device including at least a processor in communication with a memory thereby to execute commands of an application stored in the memory;

the processor in communication with input/output apparatus as directed by the commands of the application stored in the memory;

each portable digital device in communication with a local network thereby to place each portable digital device in communication with each other portable digital device participating in the role-play; a downloadable role-play application which is downloaded and stored on and executing on each portable digital device;

a suite of audio files for each portable digital device participating in the role-play; each suite of audio files containing a file specific to each character in the role play which incorporates:
a) The characters' internal dialogue;
b) Dialogue between the character and other characters within the role play;
c) Directions for the individualised, co-ordinated choreographed movement of the player;
d) Sound effects, and;
e) Musical score, and
wherein content of the roleplay, experienced through listening to the audio files, requires the player and their co-players, to physically enact a series of pre-determined, choreographed and co-ordinated movements.

BRIEF DESCRIPTION OF DRAWINGS

Embodiments of the present invention will now be described with reference to the accompanying drawings wherein.

DESCRIPTION OF EMBODIMENTS

First Preferred Embodiment

Figure 1:
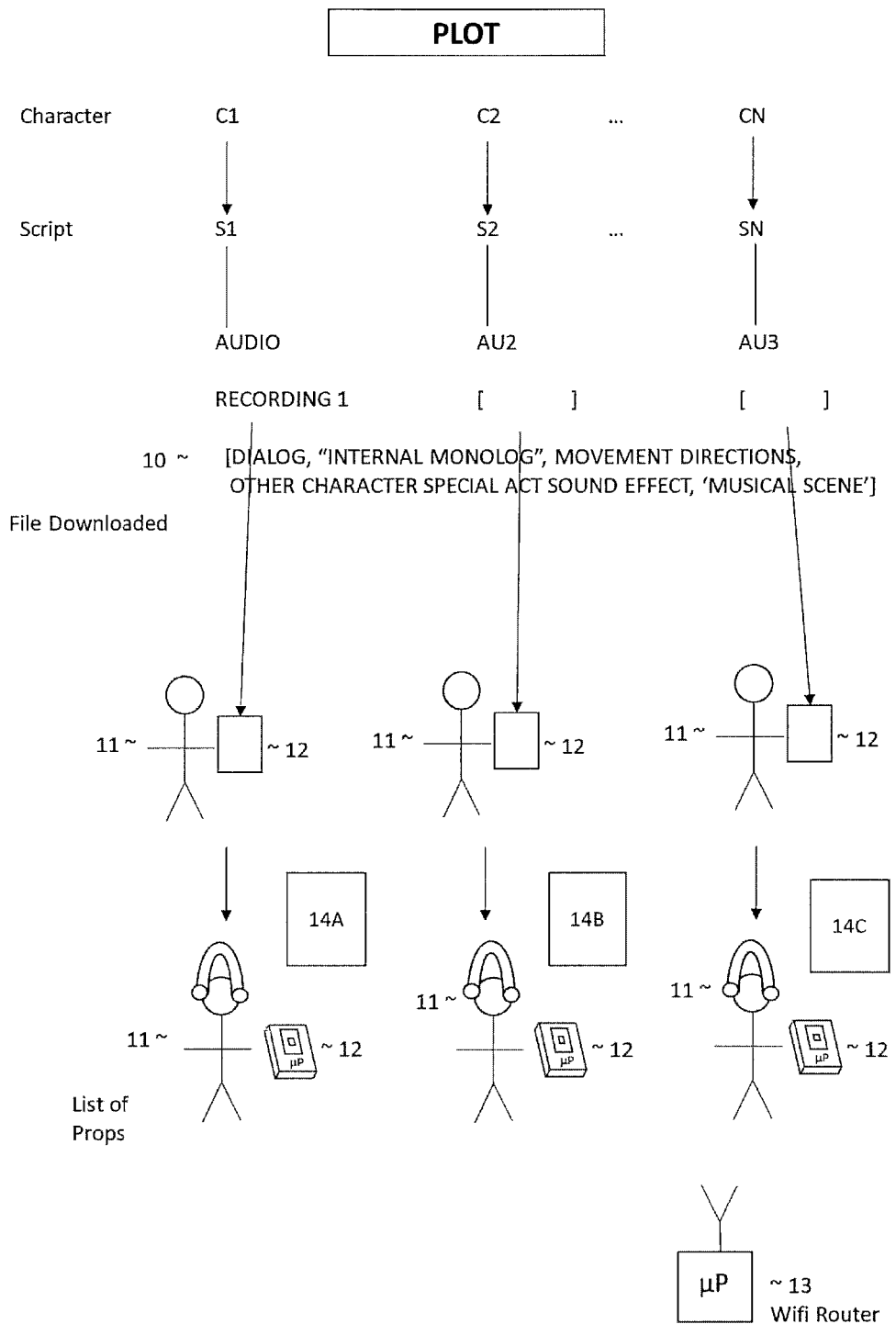
FIG. 1 is a block diagram of a role-play synchronisation system in accordance with a first embodiment of the present invention.

FIG. 1 is a block diagram of a role-play synchronisation system in accordance with a first preferred embodiment of the present invention, In this instance system 10 is comprised of multiple players 11, each having a portable digital device 12. Each portable digital device 12 includes an input/output apparatus in communication with a processor and a memory.

The input output apparatus communicates with headphones 15 whereby each player 11 can receive an audio stream 16.

In preferred forms each audio stream 16 includes at least dialogue and movement directions 14 A, 14 B, 14 C . . . for each respective player. In preferred instances the dialogue and movement directions are specific to each player, each player 11 assuming a different role in a role-play operating under the system 10.

In further preferred forms the audio stream 16 may include internal monologue.

In further preferred forms the audio stream 16 may include movement directions for the player.

In further preferred forms the audio stream 16 May including other characters speaking back.

In further preferred forms the audio stream may include sound effects.

In further preferred forms the audio stream may include a musical score. In particular preferred forms any one or more of these may be customised, specific and unique to each player as compared with the audio stream received by any other player.

In a further to your preferred form the portable digital devices 12 communicate over a local area network.

In a particular preferred form the local area network is hosted by a router.

In a further particular form the network is hosted by a Wi-Fi router 17.

In use all portable digital devices 12 which are intended to participate in the role-play of the system 10 are set to communicate over a common radio network via the Wi-Fi router 17.

The radio network may extend at least tens of meters and, in some instances up to 200 m or more thereby allowing extensive movement and distribution of the role-play in a predetermined volume.

In some instances the venue may be a hall. In other instances it may be multiple rooms of a building. In yet other instances it may extend into an open area. In any event, it is a requirement that the role play is bound by both geographical location and time; that is, all players must be playing the same role play at the same time and be physically at the same location.

As part of an initial set up, it needs to be established precisely which portable digital devices 12 will participate in the role-play. It is essential that exactly the number of devices are joined to the network as the number of characters in the narrative to be acted.

In a particular preferred form of the invention one of the portable digital devices may assume the function of a server in a client/server arrangement for the system 10. Alternatively, an additional portable device not actually participating may perform the function of client/server.

In use as a first step to commencing a role-play it is required that a common start event be applied to all portable digital devices 12 participating in the role-play whereby or commence transmission of the respective audio streams 16 at substantially the same time and maintain synchronisation thereafter.

In many instances it is known that the regulating timing for each processor within each portable digital device 12 may vary from device to device thereby requiring not just an initial synchronisation for the start event but ongoing, periodic synchronisation events. In preferred forms these events are regulated is rated by the server communicating across the radio network established via the Wi-Fi router 17.

Figure 2:
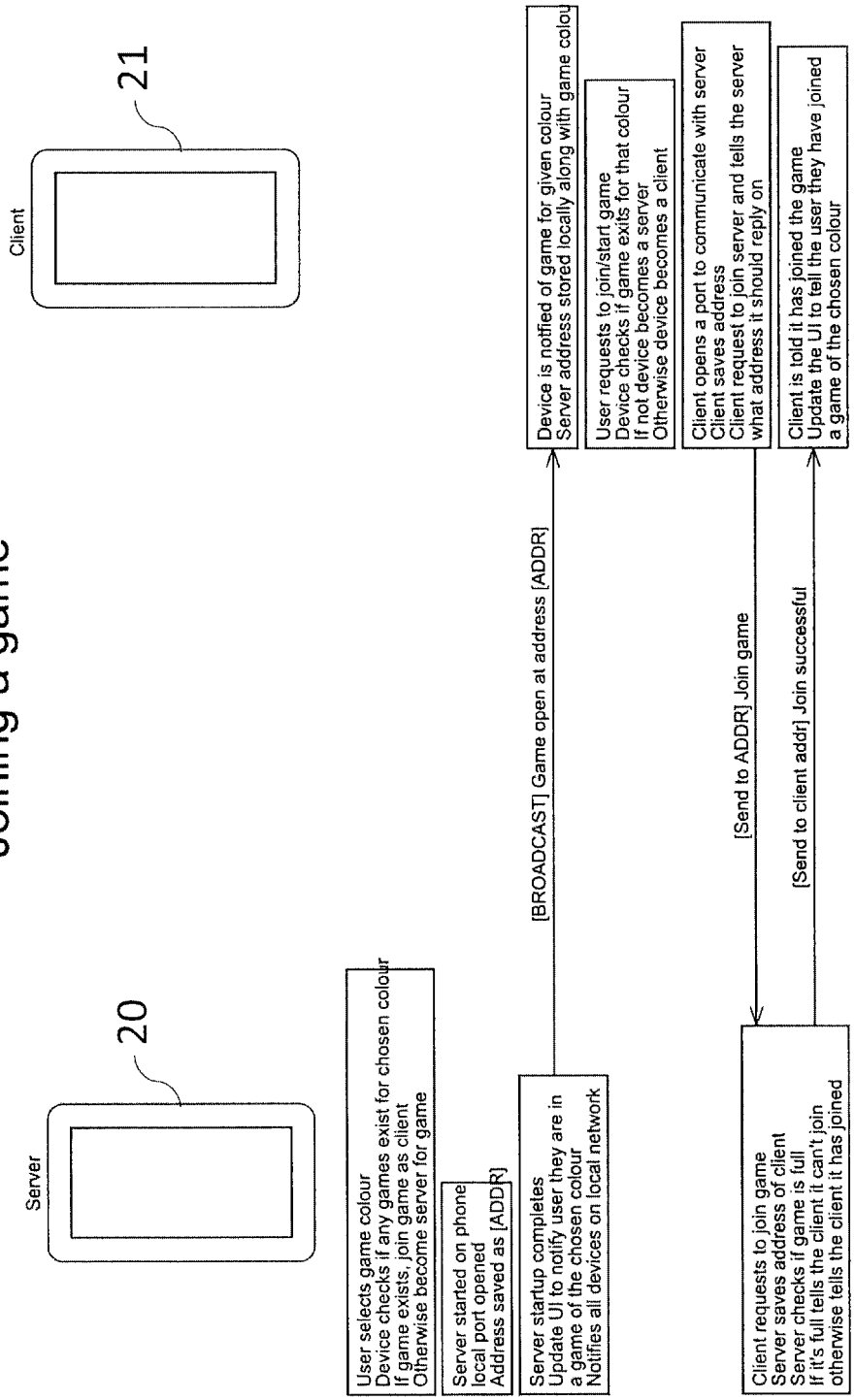
FIG. 2 is a logic diagram of a mechanism for a methodology by which a player may join a role-play game of FIG. 1, FIG. 3, is a logic diagram of a mechanism for synchronising audio input to the various players participating in the role-play game of FIG. 1, FIGS. 4A-4F comprise screenshots presented to players in the role-play game of FIG. 1 on their portable digital communications devices.

With particular reference to FIG. 2 there is shown a flow diagram for at least one arrangement for joining a role-play game.

In this instance at least one portable digital device 20 assumes the role of a server whilst others of the portable digital devices 21 assume the role of client and are available for connection to headphones 15 for each player.

A particular logic flow is illustrated in a sequence block diagram within FIG. 2.

Figure 3:
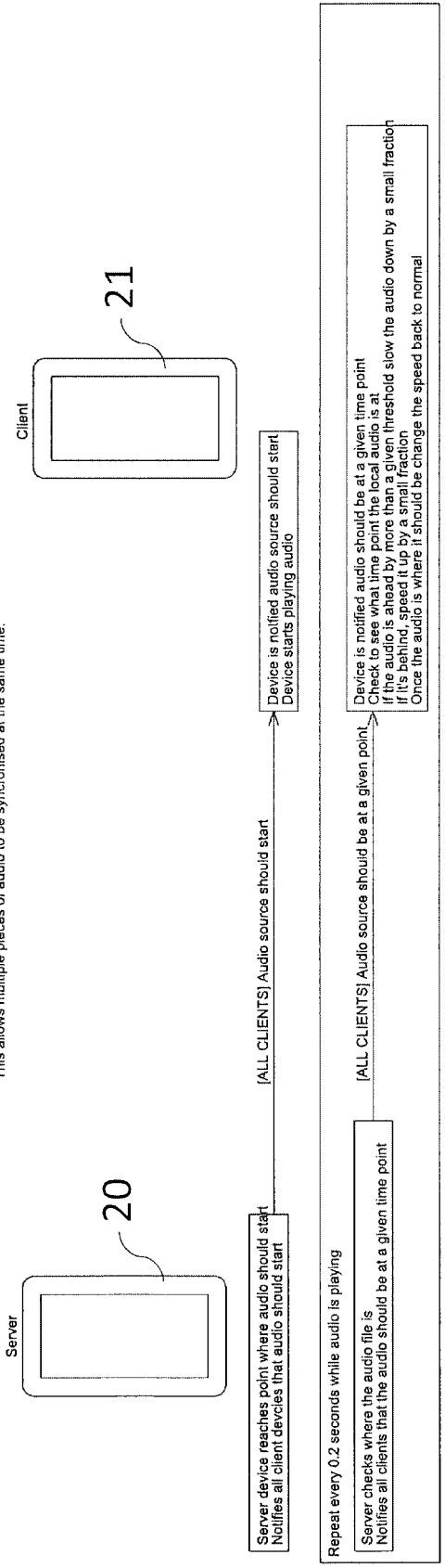
Figure 4A:
Figure 4A:
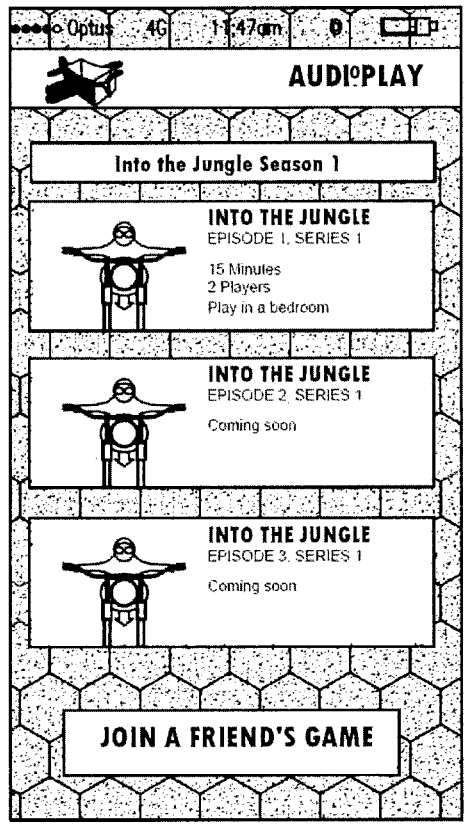
Figure 4B:
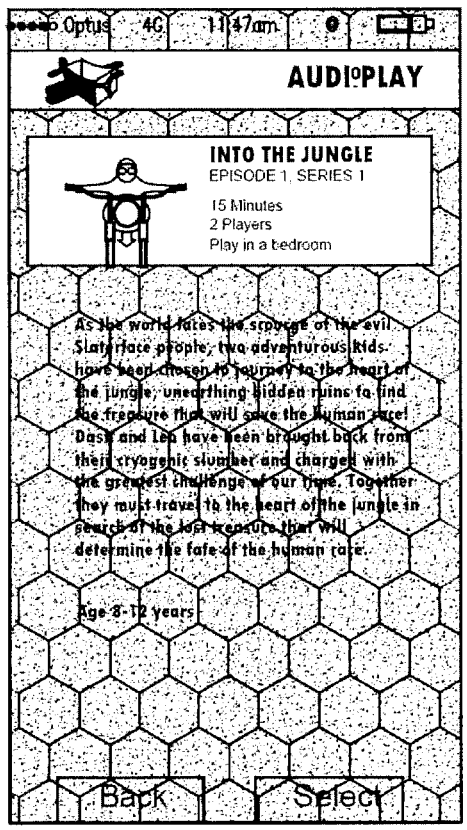
Figure 4B:
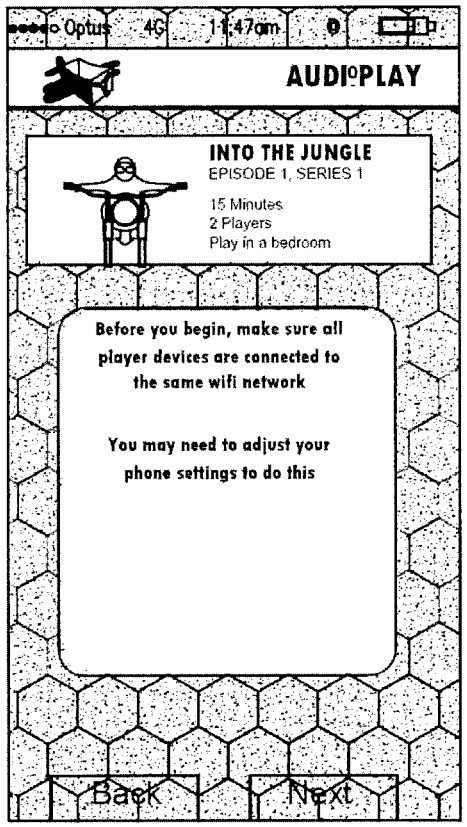
Figure 4C:
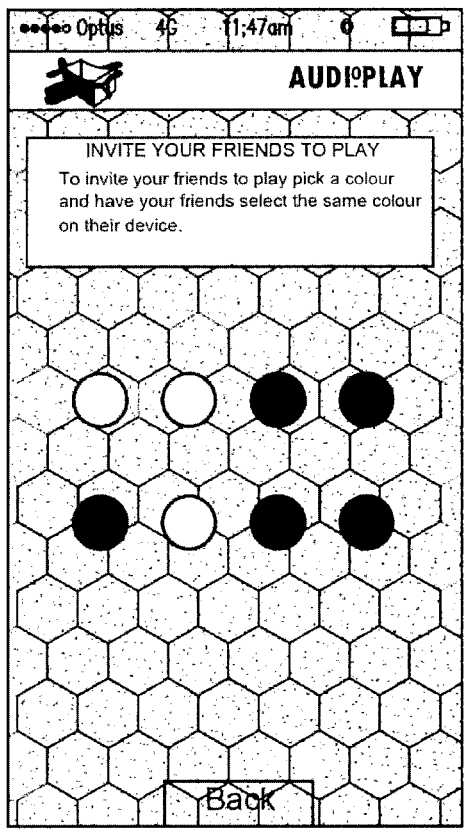
Figure 4C:
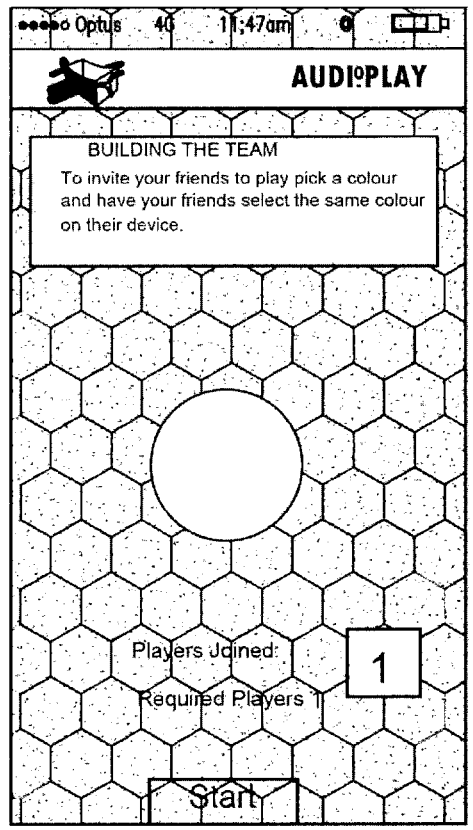
Figure 4D:
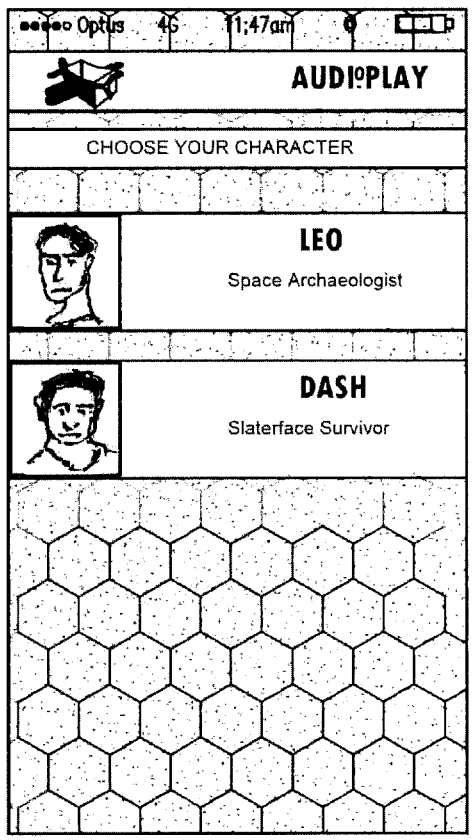
Figure 4D:
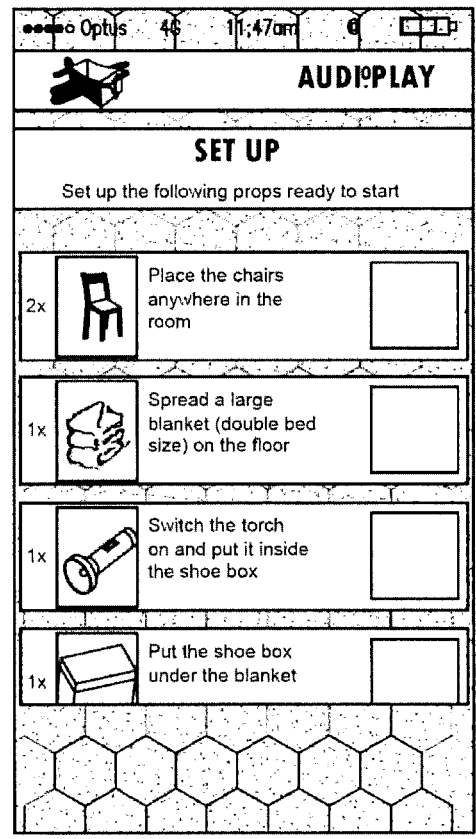
Figure 4E:
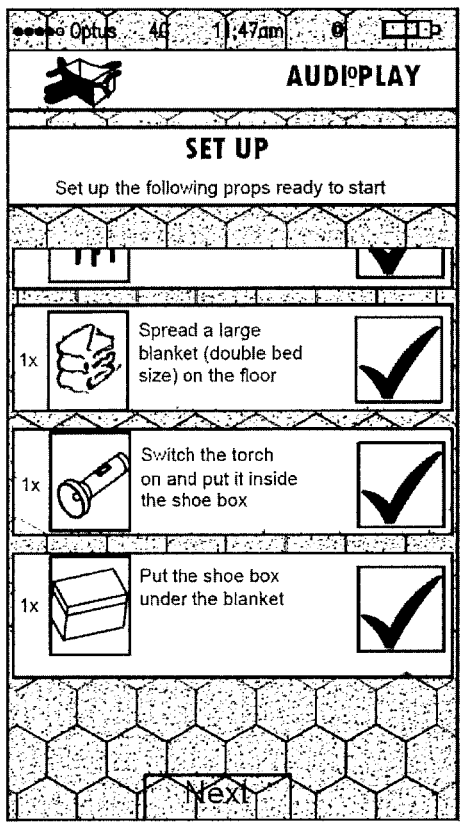
Figure 4E:
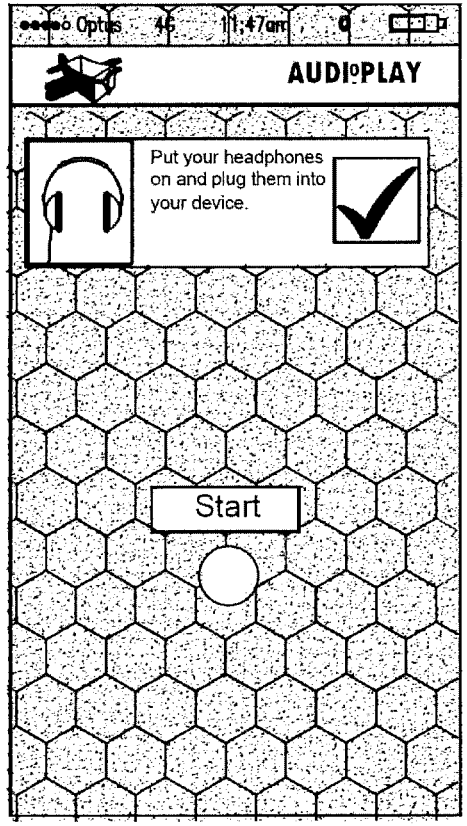
Figure 4F:
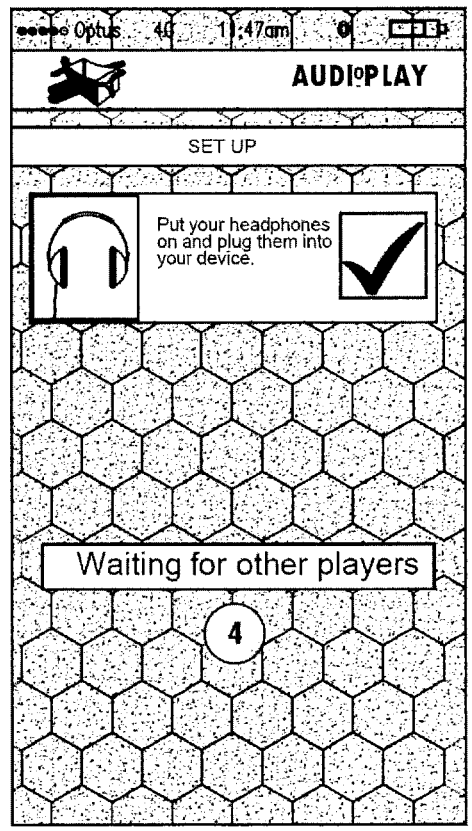
Figure 4F:
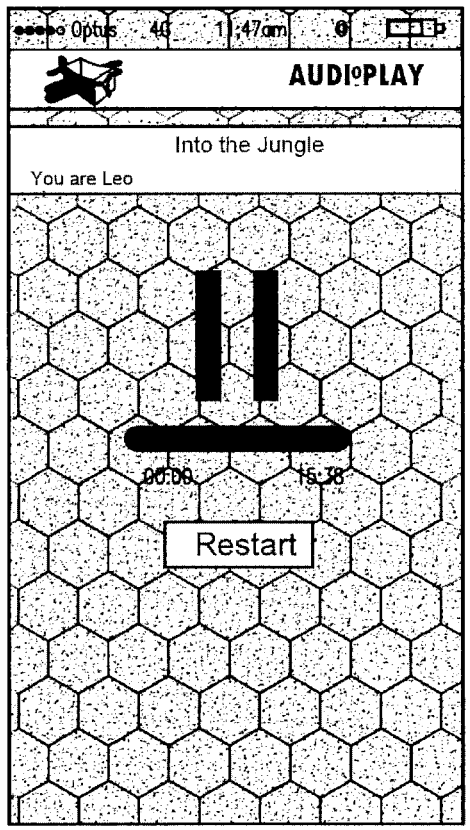

As illustrated with particular reference to FIG. 3 once all portable digital devices are connected in a client/server relationship, preferably across a local radio network such as a Wi-Fi network orchestrated by a router 17 there is an initial synchronisation sequence followed outlined in the block flow diagram within FIG. 3.

You will be observed that there is synchronisation not just for the commencement of a role-play but synchronisation in a periodic ongoing fashion in order to ensure continued synchronisation of the audio streams 16.

It will be appreciated that if the respective streams 16 lose synchronisation, even by only one second, this can be significantly distracting to the players 11. Beyond a certain point the role-play may become unplayable or may assume comic proportions.

FIGS. 4A-4F comprise screenshots presented to players in the role-play game of FIG. 1 on their portable digital communications devices.

INDUSTRIAL APPLICABILITY the end result of applying at least some of described embodiments is a workable system of providing synchronised audio streams not just on an initial basis but on an ongoing basis such that the players within any given role-play may perform individualised, coordinated, choreographed movements. In preferred forms, at the same time, they are aware of the performance of other players within the same role-play and by virtue of the synchronisation and the creative elements within the audio, a meaningful interaction is facilitated in accordance with the intentions of the authors of the work from which the role-play is derived.

In Use

In use the invention, with reference to the drawings, provides a system and method of role playing in which players are guided to act out a story according to instructions provided on portable digital devices. The instructions may include character's internal dialogue, dialogue between characters, sound effects and music as well as directions for players to physically perform movement appropriate to the story.

The invention claimed is:

1. A role-play system for distributing role-play instructions amongst two or more role-players and for synchronising role-play amongst two or more role-players; role-play comprising actions performed by each one of said two or more role-players so as to create interactions between each role-player in a venue in which they physically act as characters they have been assigned by the system; role playing action manifesting as the role-player undertaking a series of guided physical movements under instructions from audio provided; and wherein the audio includes elements of vocal performance, musical expression and sound effects which guide each role-player to interpret their guided physical movements as elements in a scripted story; said system comprising:

a portable digital device closely associated with each role-player;

each portable digital device including at least a processor in communication with a memory thereby to execute commands of an application stored in the memory;

the processor in communication with input/output apparatus as directed by the commands of the application stored in the memory;

each portable digital device in communication with a local network thereby to place each portable digital device in communication with each other portable digital device participating in the role-play; a downloadable role-play and synchronisation application which is downloaded and stored on and executing on each portable digital device;

a suite of audio files for each portable digital device participating in the role-play; each suite of audio files containing a file specific to each character in the role-play which incorporates:
  a) the characters' internal dialogue;
  b) dialogue between the character and other characters within the role play;
  c) direction for individualised, co-ordinated choreographed guided physical movement of the role-player;
  d) sound effects, and;
  e) musical score, and wherein content of the role-play, experienced through listening to the audio files, requires the role-player and their co-players, to physically enact a series of pre-determined, choreographed and co-ordinated guided physical movements which are a key component of the role-play experience;

wherein each portable digital device participating in the role-play commences execution of its respective script at the same time based on a synchronization signal communicated between all portable digital devices participating in the role-play;

wherein the synchronisation signal is sent when all portable digital devices participating in the role-play signal that the role-player associated with each portable digital device indicates they are ready to commence the role-play;

and wherein each portable digital device is synchronized continuously during role-play with respect to each other portable digital device and with respect to said guided physical movements, by a) commencing execution of its respective audio file at the same time, once all devices have indicated they are ready to commence the role-play;

b) checking each other periodically and continuously to maintain synchronization for the duration of the audio files execution;

thereby to facilitate a sequence of synchronized guided physical movements which manifest in the real world.

2. The system of claim 1 wherein each role-player is bound both geographically and in time; and wherein role-players play the same role-play while physically attending the same location.

3. The system of claim 1 wherein the input/output apparatus includes radio communication apparatus in communication with a local transmitter/receiver.

4. The system of claim 3 wherein the local transmitter/receiver is a Wi-Fi router.

5. The system of claim 3 wherein the radio communication apparatus includes apparatus operating according to Wi-Fi radio protocol.

6. The system of claim 1 wherein, during role-play, each role-player wears headphones to hear the audio files specifically associated with their chosen character, enabling them to physically enact the action as directed by the audio recording.

7. The system of claim 6 wherein the headphones exclude external sound from being perceived by the role-player wearing the headphones.

8. The system of claim 1 wherein the portable digital devices check each other periodically and continuously for timing differences.

9. The system of claim 1 wherein one of the portable digital devices may assume the role of a server to applications running on others of the portable digital devices participating in a role-play.

10. The system of claim 9 wherein a one of the portable digital devices assumes the role of a server under predetermined conditions.

11. The system of claim 1 wherein each portable digital device is synchronized by slowing down the audio by a small fraction if the audio stream is ahead and speeding up the audio by a small fraction if the audio stream is behind until synchronization is obtained.

12. A role-play method for distributing role-play instructions amongst two or more role-players and for synchronising role-play amongst the two or more role-players; role-play comprising actions performed by each one of said two or more role-players so as to create interactions between each role-player in a venue in which they physically act as characters they have been assigned by the system; role-playing action manifesting as the role-play undertaking a series of physical movements under instructions from audio provided; and wherein the audio includes elements of vocal performance, musical expression and sound effects which guide each role-player to interpret their guided movements as elements in a scripted story; wherein role-players and their co-players, physically enact a series of pre-determined, choreographed and co-ordinated movements which are a key component of the role-play experience; the method including the steps of:

providing portable digital devices closely associated with each role-player; each portable digital device including at least a processor in communication with a memory thereby to execute commands of an application stored in the memory, arranging communication of the processor with input/output apparatus as directed by the commands of the application stored in the memory, Connecting each portable digital device with a local network thereby to place each portable digital device in communication with each other portable digital device participating in the role-play, providing a suite of audio files for each portable digital device participating in the role-play; each suite of audio files containing a file specific to each role-playing character;

the method further including each portable digital device participating in the role-play commencing execution of its respective script at the same time based on a synchronization signal communicated between all portable digital devices participating in the role-play;

wherein the synchronization signal is sent when all portable digital devices participating in the role-play signal that the role-player associated with each portable digital device indicates they are ready to commence the role-play;

and wherein each portable digital device is synchronized, to a high level of accuracy, to a) commence execution of its respective audio file at the same time, once all devices have indicated they are ready to commence the role-play;

b) check each other periodically and continuously to maintain synchronization for the duration of the audio files execution;

c) facilitate a sequence of synchronized events which manifest in the real world.

13. The method of claim 12 wherein the suite of audio files includes the characters' internal dialogue.

14. The method of claim 12 wherein the suite of audio files includes dialogue between the character and other characters within the role-play.

15. The method of claim 12 wherein the suite of audio files includes directions for individualised, co-ordinated choreographed guide physical movement.

16. The method of claim 12 wherein each portable digital device is synchronized by slowing down the audio by a small fraction if the audio stream is ahead and speeding up the audio by a small fraction if the audio stream is behind until synchronization is obtained.

17. A role-play system for distributing role-play instructions amongst two or more role-players and for synchronising role-play amongst two or more role-players; role-play comprising of a sequence of synchronized events which incorporate synchronised guided physical movement of the role-players, the synchronised use of physical objects, the synchronised guided use of physical space and the synchronised use of audio material; role-play simultaneously experienced by two or more role-players so as to create interactions between each role-player in a venue in which they physically act as characters they have been assigned by the system; role-playing action manifesting as the role-play undertaking a series of guided physical movements under instructions from audio provided; and wherein the audio includes elements of vocal performance, musical expression and sound effects which guide each role-player to interpret their guided physical movements as elements in a scripted story; said system comprising:

a portable digital device closely associated with each role-player;

each portable digital device including at least a processor in communication with a memory thereby to execute commands of an application stored in the memory;

the processor in communication with input/output apparatus as directed by the commands of the application stored in the memory;

each portable digital device in communication with a local network thereby to place each portable digital device in communication with each other portable digital device participating in the role-play; a downloadable role-play and synchronisation application which is downloaded and stored on and executing on each portable digital device;

a suite of audio files for each portable digital device participating in the role-play; each suite of audio files containing a file specific to each character in the role-play which incorporates:
  a) the characters' internal dialogue;
  b) dialogue between the character and other characters within the role-play;
  c) directions for the individualised, co-ordinated choreographed guided physical movement of the player;
  d) sound effects, and;
  e) musical score, and wherein content of the role-play, experienced through listening to the audio files, requires the role-player and their co-players, to physically enact a series of pre-determined, choreographed and co-ordinated guided physical movements which are a key component of the role-play experience;

wherein each portable digital device participating in the role-play commences execution of its respective script at the same time based on a synchronization signal communicated between all portable digital devices participating in the role-play;

wherein the synchronisation signal is sent when all portable digital devices participating in the role-play signal that the role-player associated with each portable digital device indicates they are ready to commence the role-play;

and wherein each portable digital device is synchronized continuously during with respect to each other portable digital device and with respect to said guided physical movements, by
  a) commencing execution of its respective audio file at the same time, once all devices have indicated they are ready to commence the role-play;
  b) checking each other periodically and continuously to maintain synchronization for the duration of the audio files execution;

thereby to facilitate a sequence of synchronized guided physical movements which manifest in the real world.

18. The system of claim 17 wherein each portable digital device is synchronized by slowing down the audio by a small fraction if the audio stream is ahead and speeding up the audio by a small fraction if the audio stream is behind until synchronization is obtained.

* * * * *